INVENTOR.
HERBERT R. PHILLIPS

Sept. 18, 1951 H. R. PHILLIPS 2,568,409
EXHAUST EXTENSION AND GUARD FOR AUTOMOBILES
Filed Feb. 23, 1949 2 Sheets-Sheet 2

INVENTOR.
HERBERT R. PHILLIPS
BY
*Irving Seidman*
ATTORNEY.

Patented Sept. 18, 1951

2,568,409

UNITED STATES PATENT OFFICE 2,568,409

EXHAUST EXTENSION AND GUARD FOR AUTOMOBILES

Herbert R. Phillips, Riverdale, N. Y.

Application February 23, 1949, Serial No. 77,795

2 Claims. (Cl. 293—69)

This invention relates to automobiles and particularly to the exhaust conduit, the guard and bumper for same.

Broadly, it is an object of my invention to provide a combination upstanding climb guard and exhaust conduit in association with a bumper.

More particularly, it is an object of the invention to protect the exhaust conduit against damage and breakage.

The causes of damage to the exhaust conduit are many. Curbstones in different cities and in the same city vary greatly in height. At the present time, the end of the exhaust conduit on automobiles is rigid and rather low and in backing the vehicle towards a curb the rear end of the vehicle will pass over the curb and the exhaust conduit will be damaged or broken against the curb. Depressions and obstacles, such as stones in streets and roads are also causes of damage to the exhaust conduit which is in such low position. Another cause of damage is in another vehicle running into the rear end of the automobile in front. If the front bumper of the rear vehicle is lower than the rear bumper of the front automobile, the front bumper will pass beneath the rear bumper of the preceding automobile and may cause damage to the exhaust conduit of the front automobile.

I have therefore designed a novel combination exhaust conduit and upstanding climb guard which has the following advantages in order to reduce damage and breakage to a minimum. The end of the exhaust conduit is housed within the upstanding climb guard so that the guard acts as a protector for the end of the conduit. By placing the end of the exhaust conduit into the said guard the exhaust conduit is raised well above the average height of the exhaust conduit of the passenger automobiles now in use. I have also made my exhaust conduit flexible instead of rigid so that it will not be apt to break or damage as readily as the present exhaust conduits now in use.

For a fuller understanding of the nature and objects of the invention, reference is had to the following detailed description in connection with the accompanying drawings, in which.

Figure 1:
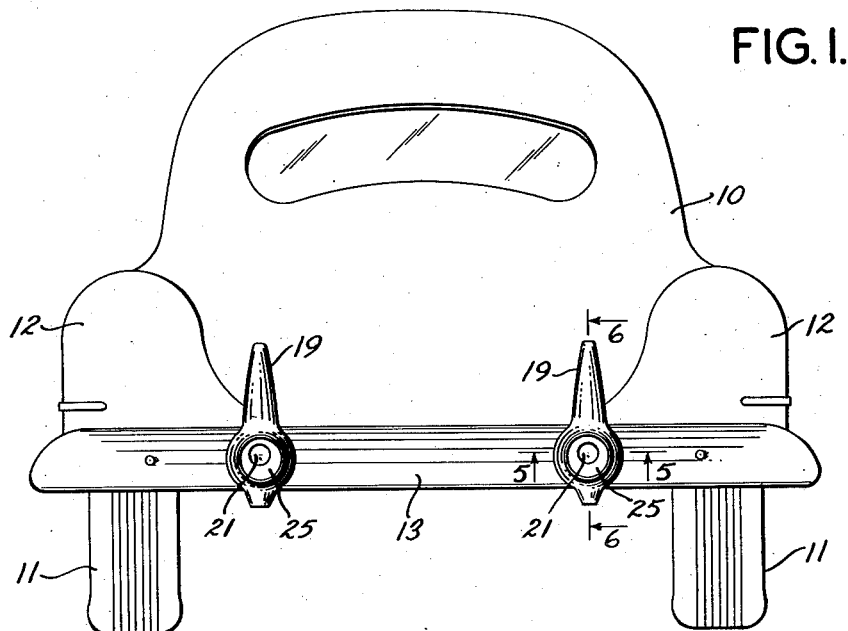
Fig. 1 is a rear elevational view of an automobile.

Referring to the drawings, the invention is shown as applied to the rear end of an automobile. The vehicle is provided with the usual body 10, the rear wheels being indicated at 11. Rear fenders 12 extend over wheels 11.

A rigid bumper 13 extends transversely across the rear of the vehicle and spaced somewhat away from the fenders 12. Bumper 13 may be supported on the vehicle frame in any well known manner but is preferably provided with flexing supports 14 and 15 so that movement of the bumper 13 relative to the body 10 as by an impact flexes the supports 14 and 15. The ends of supports 15 are slidably attached against supports 14 along one end while the opposite end 17 is attached to the bumper 13 by bolt 18.

At either side of the automobile the bumper 13 is provided with an upstanding climb guard 19 and is attached to the bumper by bolt 18 which also holds one end of support 15, as heretofore described. The guard 19 is hollow and conforms to the curvature of the bumper 13. Guards 19 have inner walls 20 which have openings 21 to receive one end of the flexible exhaust conduits 22—23. The ends of conduits 22—23 are firmly attached to the walls 20 by any known means. The bumper 13 has openings 24 to coincide with openings 21 in the guards so that the conduits 22—23 may pass therethrough. Each guard 19 also has an opening 25 which communicates with openings 21 and thus with the hollow conduits 22 to permit the exhaust gases to escape. The shapes of climb guards are well known and any such shapes may be used with my improvements. Guards 19 may be attached to the bumper 13 by any known means.

Figure 2:
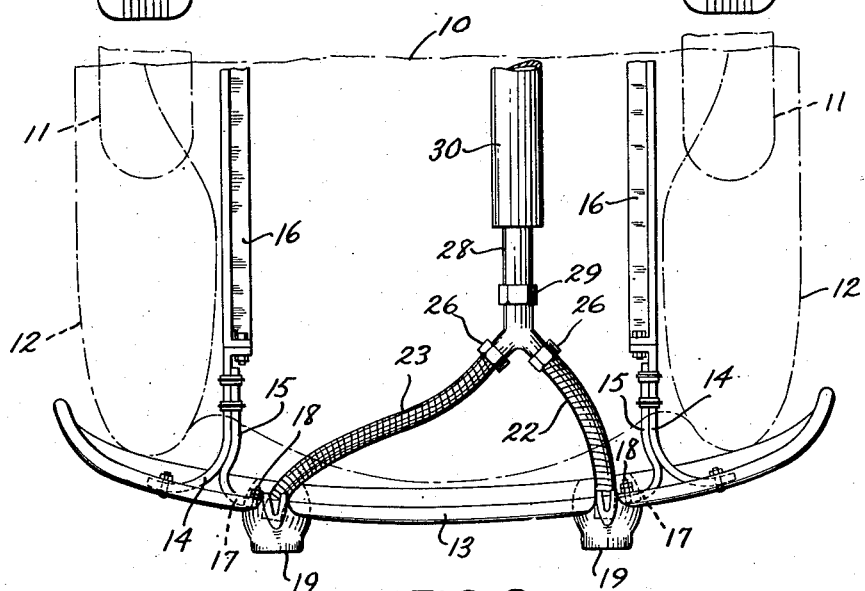
Fig. 2 is a bottom view.
Figure 5:
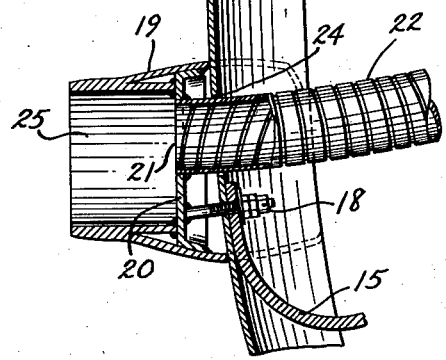
Fig. 5 is an enlarged view taken along line 5—5 of Fig. 1.

The flexible conduits 22—23, as shown in Fig. 2, are attached by couplings 26 to a hollow Y-shaped coupling 27 which is connected to another pipe 28 by couplings 29 and thence to the exhaust tail pipe 30. Such construction provides flexibility and height above the street for the ends of the conduits and protection for the conduits by the climb guards.

Figure 3:
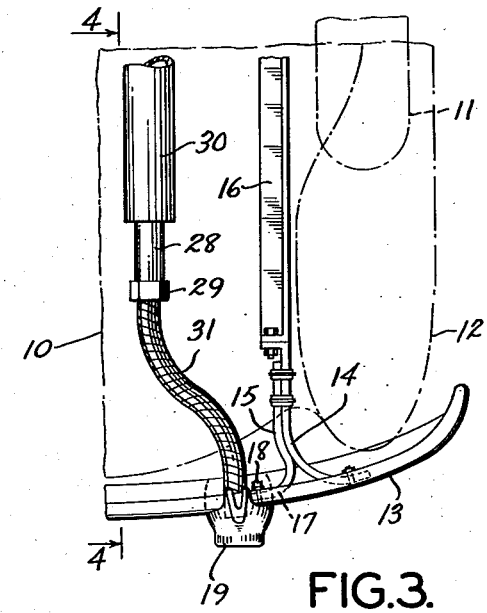
Fig. 3 is a bottom view of a modified structure.
Figure 6:
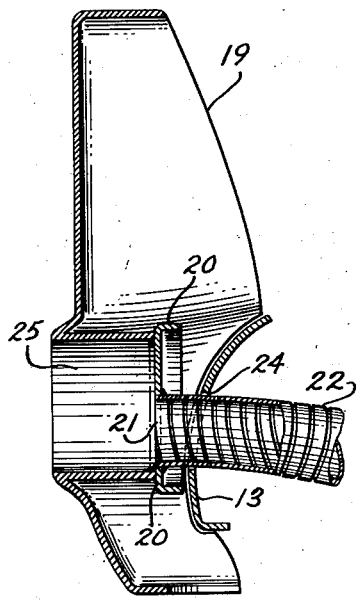
Fig. 6 is an enlarged view taken along line 6—6 of Fig. 1.
Figure 4:
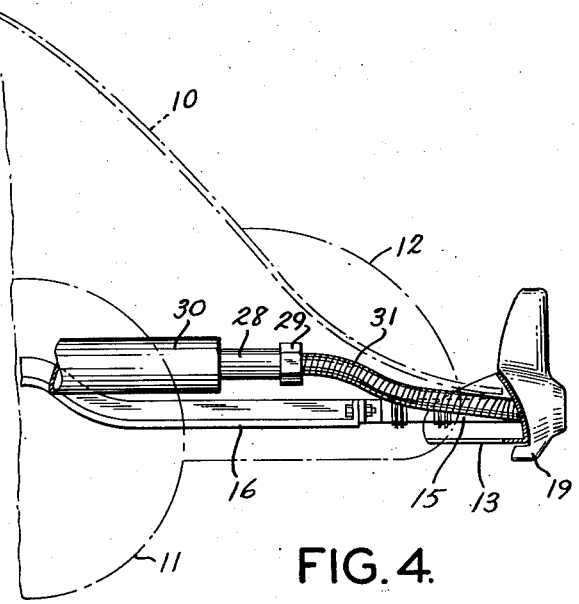
Fig. 4 is a view taken along line 4—4 of Fig. 3.

In the modification shown in Figs. 3 and 4, the construction is very much like that shown in Fig. 2, except that there is only one flexible exhaust conduit 31 leading the exhaust gases from pipes 30 and 28 through the climb guard instead of two conduits 22 and 23.

It is obvious that various changes and modifications may be made in the details of construction and arrangement of parts without departing from the general spirit of the invention.

I claim:

1. In a motor vehicle, the combination with a bumper extending transversely of the vehicle body, upstanding climb guards attached to said bumper, one of said climb guards having a flexible exhaust conduit attached thereto, an opening in said bumper and said climb guard having said attached conduit, said conduit passing through said opening in said bumper and leading to said opening in said climb guard to permit the exhaust gases to escape.

2. In a motor vehicle, the combination with a bumper extending transversely of the vehicle body, upstanding climb guards attached to said bumper, two of said climb guards having flexible exhaust conduits attached thereto, openings in said bumper and said climb guards, said conduits passing through said openings in said bumper and leading to said openings in said climb guards to permit the exhaust gases to escape.

HERBERT R. PHILLIPS.

REFERENCES CITED

The following references are of record in the file of this patent:

UNITED STATES PATENTS

| Number | Name | Date |
|---|---|---|
| D. 153,904 | Rygasewicz | May 24, 1949 |
| 2,104,182 | Best | Jan. 4, 1938 |
| 2,260,578 | Murray | Oct. 28, 1941 |
| 2,515,391 | Arbib | July 18, 1950 |